United States Patent
Ignatchenko et al.

(10) Patent No.: US 9,112,704 B2
(45) Date of Patent: Aug. 18, 2015

(54) SYSTEMS, METHODS AND APPARATUSES FOR SECURING ROOT CERTIFICATES

(71) Applicant: OLogN Technologies AG, Triesen/FL (LI)

(72) Inventors: Sergey Ignatchenko, Innsbruck (AT); Dmytro Ivanchykhin, Kiev (UA)

(73) Assignee: OLogN Technologies AG, Triesen/FL (LI)

( * ) Notice: Subject to any disclaimer, the term of this patent is extended or adjusted under 35 U.S.C. 154(b) by 0 days.

(21) Appl. No.: 13/923,756

(22) Filed: Jun. 21, 2013

(65) Prior Publication Data

US 2013/0346747 A1    Dec. 26, 2013

Related U.S. Application Data

(60) Provisional application No. 61/663,266, filed on Jun. 22, 2012.

(51) Int. Cl.
| H04L 29/06 | (2006.01) |
| H04L 9/32 | (2006.01) |
| G06F 21/64 | (2013.01) |
| G06F 21/62 | (2013.01) |

(52) U.S. Cl.
CPC .......... H04L 9/3268 (2013.01); G06F 21/6209 (2013.01); G06F 21/64 (2013.01); H04L 2209/38 (2013.01)

(58) Field of Classification Search
CPC ... H04L 63/0823; H04L 9/3268; G06F 21/64; G06F 21/6209
USPC .......................................................... 713/158
See application file for complete search history.

(56) References Cited

U.S. PATENT DOCUMENTS

| 6,513,116 | B1 | 1/2003 | Valente |
| 6,816,900 | B1 | 11/2004 | Vogel et al. |
| 2003/0014629 | A1 | 1/2003 | Zuccherato |
| 2003/0217265 | A1 | 11/2003 | Nakano et al. |
| 2004/0125959 | A1* | 7/2004 | Beuque et al. ................ 380/279 |
| 2006/0047951 | A1 | 3/2006 | Reilly et al. |

(Continued)

FOREIGN PATENT DOCUMENTS

| EP | 1 143 658 | 10/2001 |
| WO | WO 01/06701 A1 | 1/2001 |

OTHER PUBLICATIONS

Firozabadi et al., "Revocation Schemes for Delegated Authorities," Proceedings of the Third International Workshop on Policies for Distributed Systems and Networks, *The Computer Society* (2002).

(Continued)

*Primary Examiner* — Yogesh Paliwal
(74) *Attorney, Agent, or Firm* — Arnold & Porter LLP

(57) ABSTRACT

The systems, methods and apparatuses described herein provide a computing environment that manages root certificates. An apparatus according to the present disclosure may comprise a non-volatile storage storing a plurality of root certificates and a supervisor. The supervisor may be configured to receive a message identifying one of the plurality of root certificates stored in the non-volatile storage to be revoked, verify the message being signed by at least two private keys corresponding to two root certificates stored in the non-volatile storage and revoke the root certificate identified in the message.

51 Claims, 12 Drawing Sheets

(56) References Cited

U.S. PATENT DOCUMENTS

| | | |
|---|---|---|
| 2008/0091952 A1 | 4/2008 | Sumner et al. |
| 2009/0327706 A1 | 12/2009 | Ikeda et al. |
| 2011/0202759 A1* | 8/2011 | Hubbell et al. ............... 713/156 |
| 2011/0263225 A1 | 10/2011 | Escott et al. |

OTHER PUBLICATIONS

International Search Report mailed on Nov. 21, 2013, in International Patent Application No. PCT/IB2013/001317.

Jueneman et al. "Subject: Re: SET Root CA Extension—msg#00061," http://osdir.com/ml/ietf.x509/1997-07/msg00061.html, posted on or about Jul. 9, 1997.

Naor et al., "Certificate Revocation and Certificate Update," Proceedings of the 7$^{th}$ USENIX Security Symposium, San Antonio, Texas, XP055086233 (1998).

Wright et al., "Efficient Fault-Tolerant Certificate Revocation," Proceedings of the 7$^{th}$ ACM Conference on Computer and Communications Security, Athens, Greece, XP001033087 (2000).

* cited by examiner

SYSTEMS, METHODS AND APPARATUSES FOR SECURING ROOT CERTIFICATES

RELATED APPLICATIONS

This application claims priority to U.S. Provisional Application No. 61/663,266, filed Jun. 22, 2012, entitled "Systems, Methods and Apparatuses for Securing Root Certificates," the content of which is incorporated herein by reference in its entirety.

FIELD OF THE DISCLOSURE

The systems, methods and apparatuses described herein relate to data security. More particularly, they relate to securely replacing root certificates within electronic devices such as computers, laptops, smart phones, game consoles, televisions, tablets, etc.

BACKGROUND

Digital certificates and the public key infrastructure (PKI) are well-known mechanisms for electronically authenticating individuals. In the PKI, each entity has a unique, asymmetric key pair, comprising a public key and a private key. A certificate authority (CA) issues a digital certificate, listing the entity's identity credentials (e.g., name and organization) and the entity's public key, binding the entity's identity to his public key. The entity may then encrypt all (or a hash) of its outgoing message with its private key, and may distribute its digital certificate along with the encrypted message. The message recipient can decrypt the encrypted message using the sender's public key, allowing the recipient to confirm that (i) the sender has access to the corresponding private key, and therefore (ii) the sender is the individual identified in the digital certificate.

However, it is also known that digital certificates can be forged. Thus, usually, when a CA issues a new digital certificate, the CA will digitally sign the certificate using one of its own private keys. The CA will then publicize its own digital certificate, identifying itself and the corresponding public key. This will allow a message recipient to confirm that the sender's digital certificate was issued by the CA. The digital certificate has become more difficult to forge (because it required use of the CA's private key) and becomes more trustworthy.

It may be, however, that the purported CA is not trustworthy. (For example, a malicious user may have created his or her own "CA" for the purpose of signing digital certificates.) As a result, it may be desirable for the CA's digital certificate to be signed by yet another CA. This chain may continue all the way back to a "root certificate" at the top of the hierarchy, which, preferably, has been issued by a well-known and trusted CA. Common root certificate-holding CAs are VERISIGN, ENTRUST, COMODO and GLOBALSIGN.

In the field of information security, systems that rely on root private keys and root certificates are very common. Ultimately, the trustworthiness of the chain is dependent on the trustworthiness of this root certificate. Two well-known issues related to such systems are (1) the secure storage of root private keys, and (2) the population of root certificates within the systems that require them for authentication.

Usually, the root certificate is made trustworthy by some mechanism other than a digital certificate, such as by secure physical distribution. For example, some of the most well-known root certificates are embedded in hardware or software at the time the hardware is manufactured or software is installed (for example, root web certificates are normally embedded into Internet browsers).

This method for distributing root certificates relies on security which is external to the system and the previously stored root certificates themselves, which has its drawbacks. In particular, if such a root certificate (or the private key corresponding to the root certificate) is compromised, there is no secure way of updating it within the device; rather, it must be performed by some mechanism that is external to the system. For example, a system administrator might be required to download a new browser from a supposedly secure source. Moreover, once compromised, this root certificate cannot be used to verify the integrity and authenticity of a message containing a new root certificate to be used. As a result, the device essentially becomes unable to verify the identity of any senders from which it receives a message. Depending on the context, this may render the device itself useless.

What is needed are systems, methods and devices for securely making new root certificates available to electronic devices after a root certificate currently in effect becomes compromised.

DETAILED DESCRIPTION

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

Figure 1:
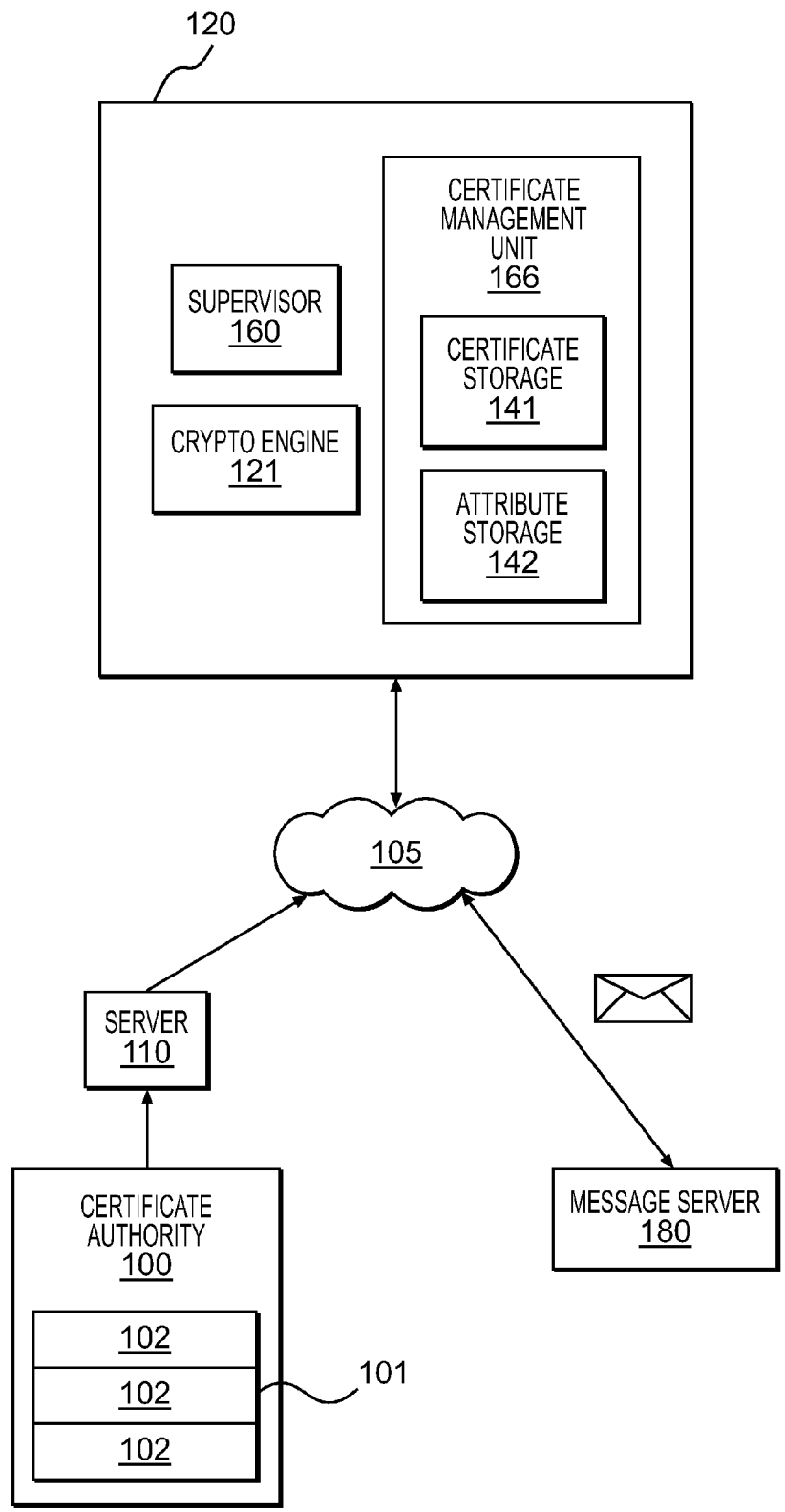
FIG. 1 is a block diagram of an exemplary system according to the present disclosure.

The invention disclosed herein provides systems, methods and apparatuses for the secure replacement of root certificates within electronic devices such as computers, laptops, smart phones, game consoles, televisions, tablets, etc. FIG. 1 shows an exemplary electronic device 120 according to the present disclosure.

As shown on FIG. 1, the electronic device 120 may communicate with one or more remote electronic devices or servers 180 via a communications channel 105 coupled to the device 120. For example, a smart phone may be capable of transmitting and receiving e-mail via Internet mail servers. This communications channel may be any suitable mechanism for transferring data, whether online (e.g., Internet) or offline (e.g., using a USB connection or a flash drive).

Also as shown on FIG. 1, the electronic device 120 may be connected via the communications channel 105 to one or more certificate authorities (CAs) 100. As will be described in greater detail below, the CA 100 may be configured to transmit information regarding its root certificates to electronic devices 120 via the communications channel 105. It will be understood that there may be one or more intermediate servers 110 between the CA 100 and an electronic device 120.

To implement the functionality described herein, the electronic device 120 may execute certain applications or functions requiring the authentication of a digital certificate (by use of a stored root certificate) in the performance of certain activities. In the foregoing example, the smart phone may authenticate and as necessary decrypt any e-mails, which include a digital certificate, received via the communications channel 105. It will be understood that e-mail is merely one exemplary use for root certificates; many other uses for root certificates exist, both related to activities which directly serve the needs of a user (such as authenticating e-mails or web pages), as well as activities which serve purposes internal to the electronic device 120 (such as, for example, secure time keeping).

As shown on FIG. 1, the electronic device 120 may contain one or more dedicated certificate management units 166. The certificate management unit 166 may comprise both root certificate storage 141 and associated certificate attribute storage 142. (These certificate attributes are discussed in greater detail below.) In certain embodiments, the certificate storage 141 may be implemented as read-only, non-volatile memory, while the attribute storage 142 may be implemented as read/write, non-volatile memory. In embodiments wherein the electronic device 120 is configured to communicate with multiple CAs, it may be preferable to configure the certificate management unit 166 such that the root certificates of each of CA 100 are saved and managed separately.

An electronic device 120 according to the present disclosure may further comprise a supervisor 160. The supervisor may be used to enforce certain operational rules of the electronic device 120 so as to provide certain security guarantees to the end-user. It may be configured to: (1) identify which root certificate, of the root certificates pre-stored within the certificate management unit 166, is currently in use; (2) validate one or more digital certificates, e.g., as may be attached to a received message, using the currently operational root certificate(s); and (3) update one or more root certificate attributes. Each of these functions are described in greater detail herein. In some embodiments, as described in more detail below, certificate storage 141 may be implemented as a read-write, non-volatile memory, and the supervisor 160 may be additionally configured to update one or more root certificates.

The supervisor 160 may be implemented in hardware and/or software within the electronic device 120, provided that in any implementation, the integrity of the supervisor 160 is maintained by the selected implementation. For example, tamper-resistant and/or tamper-detection techniques may be used for this purpose. Also, if the electronic device 120 implements the option to load and execute third-party code, measures should be taken to ensure that any such third-party code is not capable of affecting or learning the state of the supervisor 160.

The supervisor 160 and/or electronic device 120 may also (alternatively, or in addition to being tamper-resistant) incorporate one or more tamper-detection techniques. For example, several tamper-resistant methods for protecting cryptographic processors are already known and have been described in the art. In some of these embodiments, the electronic device 120 may be configured to execute one or more possible responses if it detects that the chip's integrity has been compromised, and/or if it detects penetration of the device's enclosure. These responses may vary from erasing sensitive data to the physical destruction of all or part of the electronic device 120.

In certain embodiments, the electronic device 120 may further comprise one or more cryptographic engines 121, which may be used by the supervisor 160, among other things, in support of digital certificate verification. These cryptographic engines 121 may be configured to implement one or more cryptographic algorithms, such as AES or RSA. The cryptographic engine 121 may receive data from the supervisor 160 for encryption or decryption, and may provide the resulting ciphertext (or plaintext, as appropriate) back to the supervisor 160. For example, this cryptographic capability may be used in the verification of digital signatures. In other embodiments, the supervisor 160 may be configured to perform some or all of the functionality of the cryptographic engine 121, and a separate cryptographic engine 121 may not be required.

As shown on FIG. 1, the electronic device 120 may be connected via the communications link 105 to one or more CAs 100. According to the present disclosure, each certificate authority 100 may have a set 101 of at least two root private keys 102. For each root private key 102, the CA may have a corresponding root digital certificate (containing the appropriate corresponding public key).

Each root private key also may have an associated status attribute named, for example, "active," "dormant," or "revoked." In such an embodiment, a root private key 102 having an "active" status may be used by the CA 100 for signing data, such as digital certificates. Root private keys 102 having "dormant" status may be considered not currently available for use by the CA 100, but eligible for use in the future. Dormant keys may be securely stored by the CA 100 to prevent their loss or disclosure to unauthorized third parties. In addition, for security reasons, once a root private key 102 has been selected to be active, it may be preferable to ensure that it cannot be misidentified as dormant. Finally, root private keys 102 having a "revoked" status may be entirely unavailable for use by the CA 100. For example, revoked status may be used to identify any keys which have been compromised.

In one embodiment according to the present disclosure, each CA 100 may have a set 101 of at least five (5) root private keys 102. It will be understood that while having fewer root private keys 102 is within the scope of the present disclosure, it may reduce the system's resistance to certain kind of attacks.

When an electronic device 120 is manufactured, at least two root digital certificates (corresponding to all or a subset of the set 101 of root private keys 102) may be stored within certificate storage 141 for each CA 100. In addition, one or more attributes associated with each root certificate may be stored within attribute storage 142. For example, the root certificate corresponding to the root private key 102 that is currently in use by the CA 100 may be designated as active, and all other root certificates may be identified as dormant. After manufacturing, the supervisor 160 of the electronic device 120 may be configured to use only active certificates for incoming message signature verification.

It will be understood that once root certificates have been stored in the certificate storage 141 (e.g., during device 120 manufacturing), these certificates are likely to remain in certificate storage 141 during the lifetime of the device—which may be years. For example, many electronic devices 120 such as television sets or computers are only replaced once every few years, and some may be used for a decade or even more. During this lengthy time period, a malicious user of an electronic device 120 may be able to access one or more of the root certificate public keys stored within the device 120, and attempt to use the root certificate to derive the corresponding private key, which may lead to the complete compromise of the whole system. Therefore, it may be preferable in certain embodiments to select the method of encryption for the entire certificate system such that during a correspondent time period it would be statistically impossible for a malicious user to find (for example, using a brute force attack) the private key that corresponds to the public key of any root certificate stored in the device. For example, it is currently believed that a certain key length (for example, 2048 bits or greater) of the Rivest-Shamir-Adleman (RSA) encryption method may satisfy this property.

Encryption method and key length notwithstanding, from time to time, a CA 100 may determine that a private key may need to be invalidated. For example, this may happen if the key has been compromised, or as a result of a key expiration policy. In such cases, the CA 100 may need to replace a private root key with another existing private root key or to revoke a private key. In cases wherein the CA 100 has replaced or revoked a private key, it may further wish to add one or more new private keys to the system. Systems, methods and apparatuses for each such operation are provided in the following description.

FIGS. 2-6 illustrate exemplary processes and corresponding data structures by which a private root key, and the corresponding root public key and/or root certificate, may be replaced by another private root key and its corresponding root public key and/or certificate.

In a first embodiment, the CA 100 may revoke a currently active private key and may replace it with a dormant private key (within its key set 101), which may become the new active key. This new active private key may be used to sign digital certificates and perform other root key-based activities, and the corresponding root certificate may be used to verify these digital signatures. In such a case, the CA 100 may send a certificate replacement message to one or more electronic devices 120, which may contain information regarding the root certificate to be replaced, and may further contain information regarding a replacement root certificate to be activated.

Figure 2:
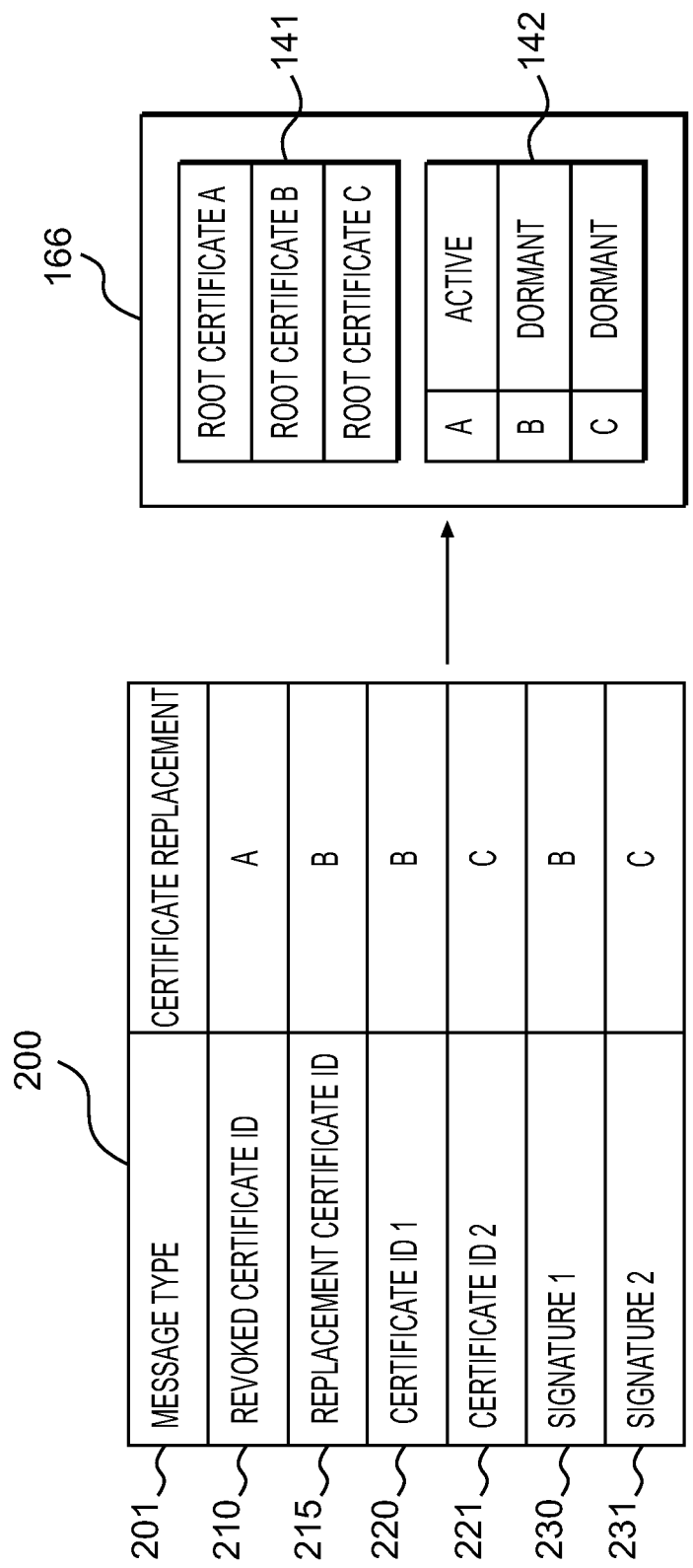
FIG. 2 shows an exemplary certificate replacement message and the contents of an exemplary certificate management unit.
Figure 3A:
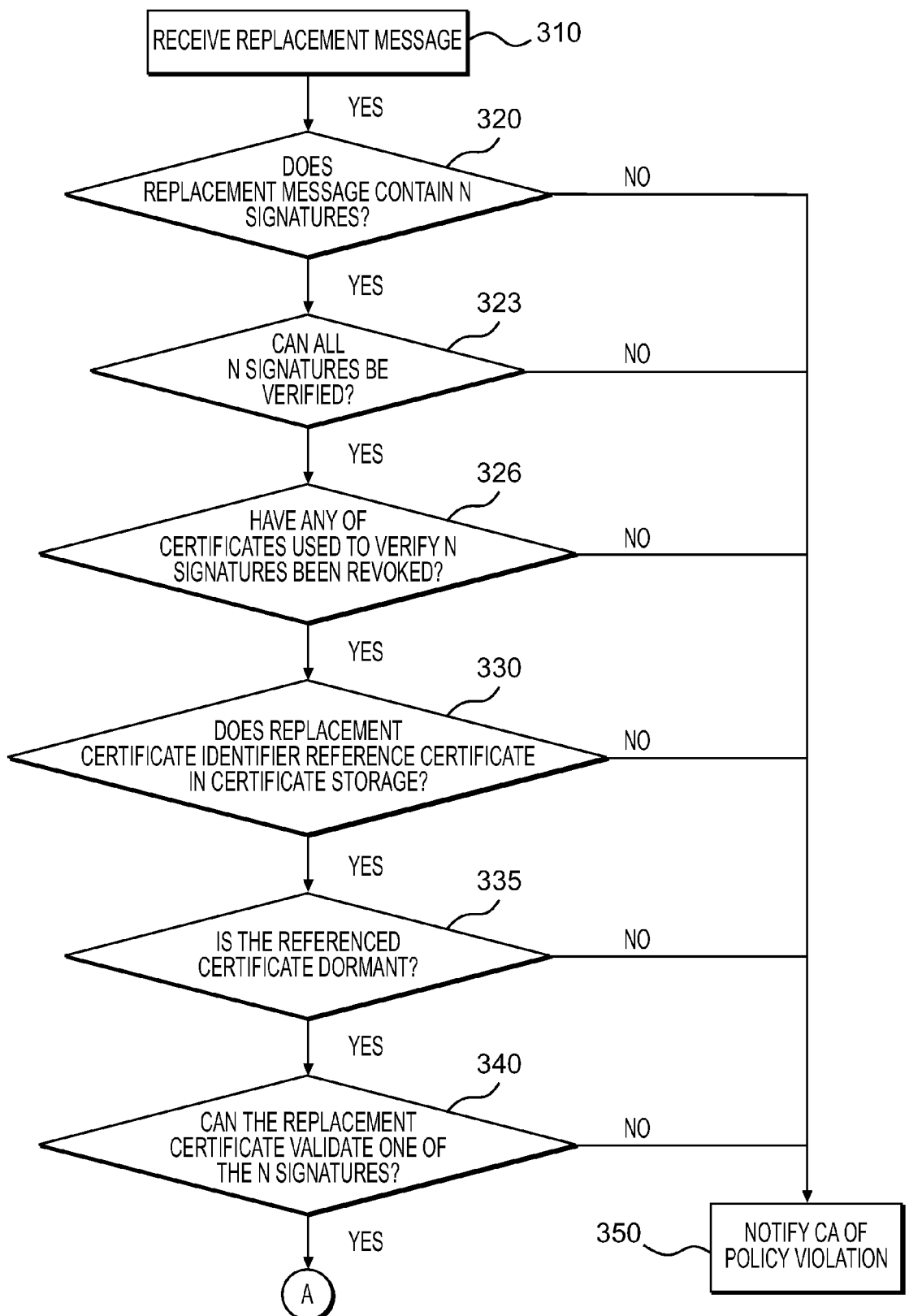
FIGS. 3A-3C show exemplary processes by which an active certificate may be replaced within an electronic device.
Figure 3B:
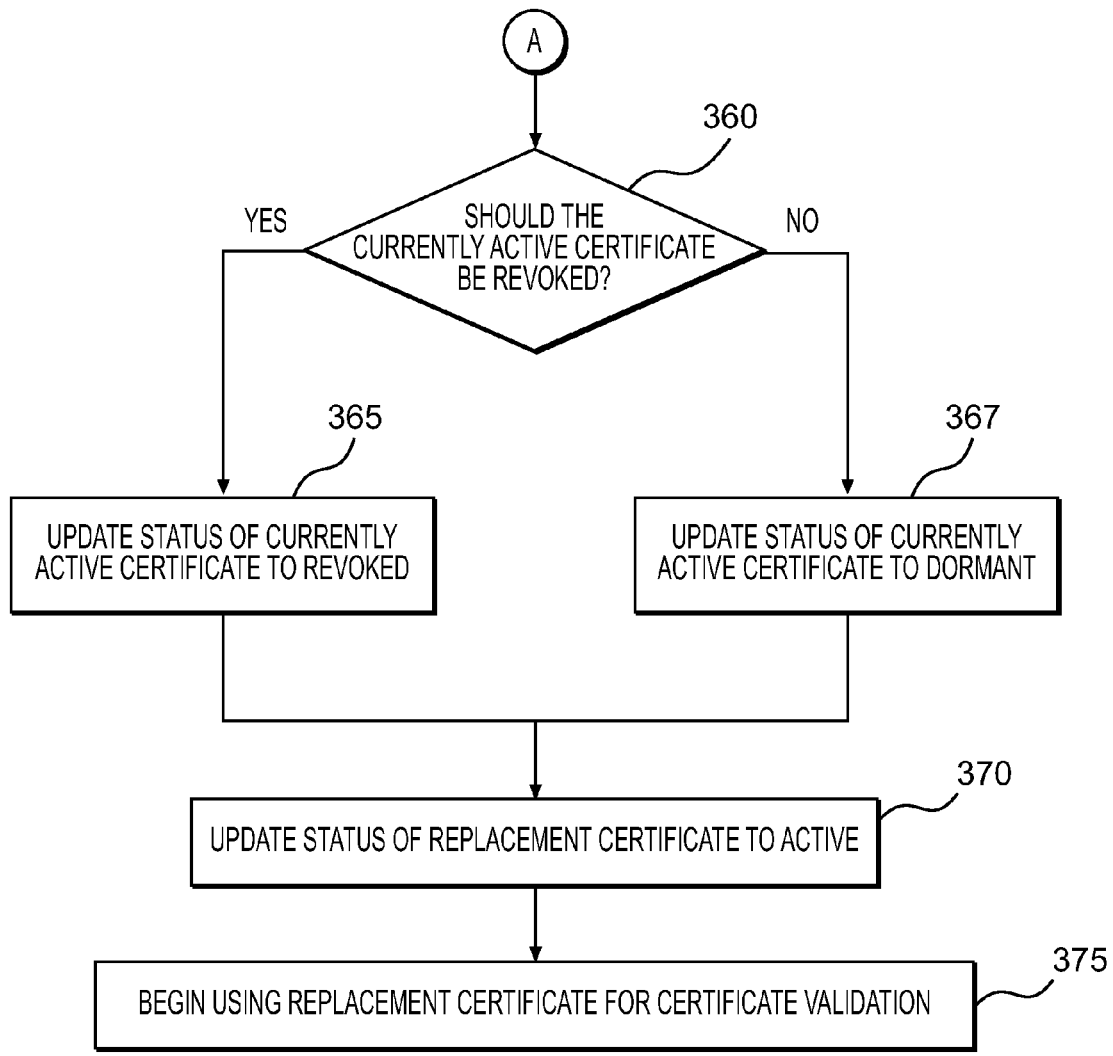
Figure 3C:
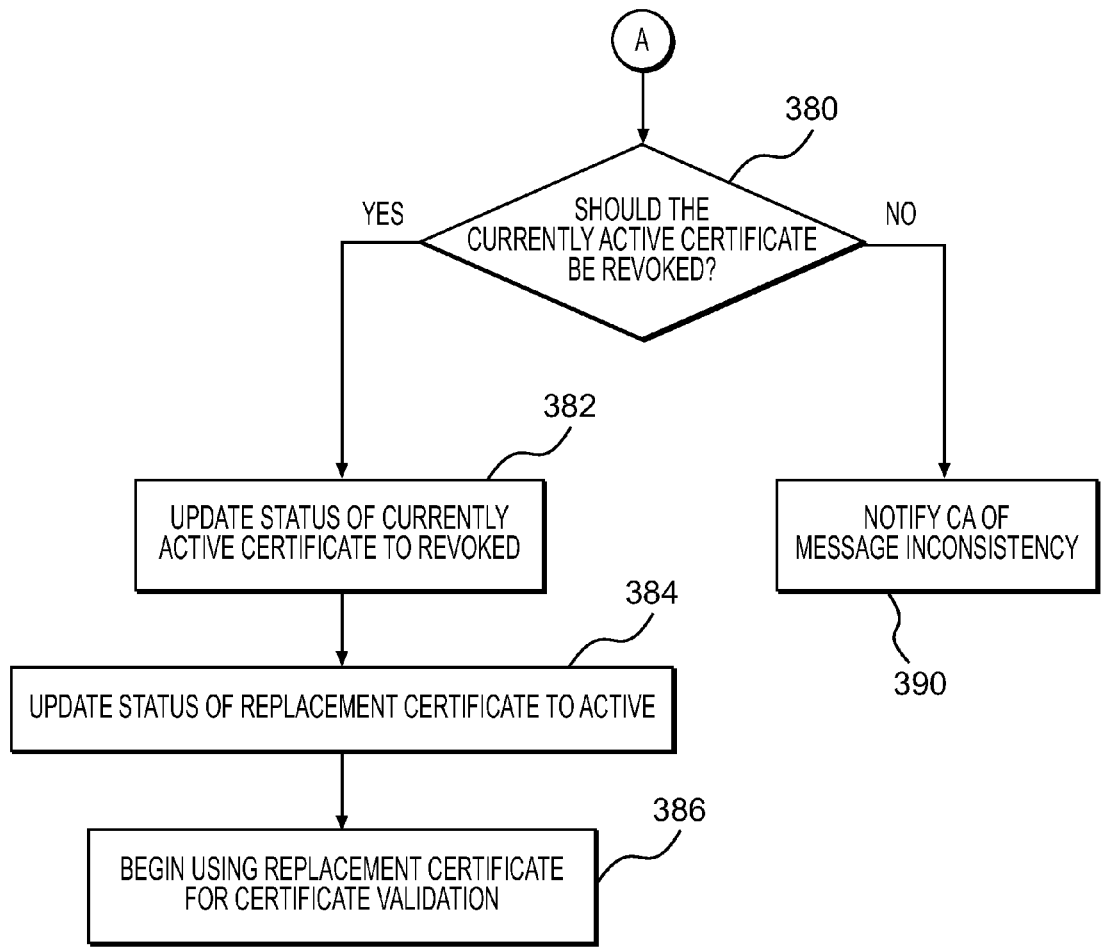

FIG. 2 shows an exemplary certificate replacement message 200 and the contents of an exemplary certificate management unit 166. FIGS. 3A-3C show exemplary processes by which a currently active certificate may be replaced in an electronic device 120 upon replacement of the corresponding private root key 101 by a CA 100. For the purposes of explanation, the processes described with respect to FIGS. 3A-3C will reference the values of the certificate replacement message 200 and certificate management unit 166 shown on FIG. 2. It will be understood, however, that these values are merely exemplary and the methods described are intended to work with any appropriate values.

FIG. 2 shows a certificate management unit 166 having three root certificates stored within certificate storage 141: root certificates A, B and C. The attribute storage 142 has the status of root certificate A listed as active, and the status of root certificates B and C as dormant.

At step 310 (FIG. 3A), the supervisor 160 may receive a message 200 (FIG. 2) from the CA 100 or via one or more intermediate servers, e.g., server 110, and may determine, based on the message type 201, that the message is a certificate replacement message 200 and should be handled accordingly. This message type 201 may be any data suitable for indicating that this is a replacement message 200. For example, as shown on FIG. 2, the message type 201 may be the string "Certificate Replacement." In other embodiments, the message type 201 may be an integer which uniquely identifies the message 200 as a replacement message.

As shown on FIG. 2, in addition to its message type 201 field, the replacement message 200 may further comprise information describing the certificate to be revoked, and the replacement certificate. Revoked certificate identifier 210 may be used to identify the root certificate in certificate storage 141 whose corresponding root private key has been invalidated by the CA 100. In the example shown on FIG. 2, the revoked certificate identifier 210 identifies root certificate A as the root certificate to be revoked. Replacement certificate identifier 215 may be used to identify the root certificate in certificate storage 141 whose corresponding root key has been activated by the CA 100. On FIG. 2, the replacement certificate identifier 215 identifies root certificate B as the root certificate which should be activated.

Steps 320-340 (FIG. 3A), each of which will be described in greater detail below, may be used to verify the authenticity of the replacement message 200. For example, in certain embodiments, before the replacement message 200 is sent to the electronic device 120, the CA 100 may digitally sign the replacement message 200 using two or more ("N") different private "signing" keys (which are a subset of the set 101 of private root keys 102). As will be discussed in greater detail below, this use of digital signatures may prevent the unauthorized invalidation and/or replacement of the currently active root certificate. Depending on the embodiment, the actual number N of signing keys may vary (e.g., one embodiment might have the message 200 signed by five keys, while in another embodiment the message 200 may have been signed only by two keys), although within any given embodiment this number N should remain constant (and may not exceed the overall size of the set 101 of root private keys 102).

For example, in one exemplary embodiment, each device 120 may be able to store up to five keys, but N may be only two. In another exemplary embodiment, each device 120 may be able to store seven keys, and N may be only two. In yet another exemplary embodiment, each device 120 may be able to store seven keys, and N may be equal three.

In certain embodiments, the N signing keys are selected from only the subset of keys within the set 101 of root private keys 102 which are dormant; in other words, the invalidated (active) private key may not be used to sign the replacement message 200. In other embodiments, one of these N signing keys may be the (active) root private key 102 being invalidated.

Additionally, the N signing keys may be required to include the replacement root private key; in other words, the N signing keys may be required to include the private key which corresponds to the digital certificate (already stored within certificate storage 141) that should be used by the supervisor 160 of the electronic device 120 as the new active certificate. (It will be understood that, in embodiments wherein the N signing keys include the private key being revoked, the replacement root private key should not be the private key being revoked, such that the new, active certificate is different from the old, revoked certificate.)

In the exemplary embodiment shown on FIG. 2, the body of the replacement message 200 (i.e., the revoked certificate identifier 210 and the replacement certificate identifier 215) may be signed by two signing keys, such that the replacement message 200 includes two digital signatures, "Signature 1" 230 and "Signature 2" 231. As shown on FIG. 2, Signature 1 230 was created using the root private key associated with certificate B and Signature 2 231 was created using the root private key associated with certificate C. In certain embodiments, it may be desirable to have one signature cover the other signature, e.g., Signature 2 231 may cover all of the revoked certificate identifier 210, the replacement certificate identifier 215 and Signature 1 230 as signed fields; in other embodiments, Signature 1 230 and Signature 2 231 may be independent. It is to be recognized, however, that additional components of the replacement message 200 may optionally also be similarly signed.

In certain embodiments the replacement message 200 may further comprise one or more fields identifying certificates which might be used to validate the N signatures. For example, the replacement message 200 may include fields identifying a subset of the certificates associated with the set of root private keys 101 and previously stored within the certificate storage 141. These certificate identifiers may be used to provide the supervisor 160 some idea of which certificates it should try, as described in further detail below, for the purpose of validating the N signatures. As shown on FIG. 2, for example, certificate identifier fields 220 and 221 identify certificates B and C as certificates which should be tried for the purpose of verifying Signature 1 230 and Signature 2 231, respectively. This can improve the efficiency of the system, because rather than the supervisor 160 trying to validate each signature (e.g., Signature 1 230) using each certificate in certificate storage 141, it only needs to try using the specific certificates identified (using the certificate identifiers, e.g., 220) in the replacement message 200.

At step 320 (FIG. 3A), the supervisor 160 may verify that the received replacement message 200 has all N signatures. For example, as shown on FIG. 2, the replacement message has two signatures, as expected.

At step 323 (FIG. 3A), the supervisor 160 may verify that those N signatures can be verified using the corresponding digital certificates previously stored (e.g., at the time of manufacturing) within the certificate storage 141. For example, as shown on FIG. 2, the two signatures 230, 231 can be verified using stored root certificates B and C. Thus, it will be understood that, because each replacement message 200 is signed using N private keys from the set 101 of root private keys 102, in order to invalidate any root certificate stored within the electronic device 120, an attacker must have at least N private keys. In embodiments wherein the replacement message 200 includes certificate identifier fields, e.g., 220 and 221 as shown on FIG. 2, the supervisor 160 may use those identifiers to reduce the number of certificates tried to validate the two signatures 230, 231.

At step 326 (FIG. 3A), the supervisor 160 may verify that the corresponding digital certificates located in certificate storage 141 have not been marked as revoked within the corresponding attribute storage 142. In the foregoing example, neither of root certificates B or C, as shown on FIG. 2, have been marked as revoked within attribute storage 141.

In some embodiments, it may be preferable to further ensure that the N signatures 230, 231 may be verified only by digital certificates (located within storage 141) specifically identified as dormant. In the foregoing example, both root certificates B and C are shown as dormant within attribute storage 141.

At step 330 (FIG. 3A), the supervisor 160 may confirm that the replacement certificate identifier 215 references a certificate already stored within the certificate storage 141, and at step 335 may further verify that any such certificate's status attribute (as stored within attribute storage 142) is dormant. In the example shown on FIG. 2, the replacement certificate identifier 215 references root certificate B, which is shown as present in certificate storage 141, and which is shown as having a status of dormant within attribute storage 142.

At step 340 (FIG. 3A), the supervisor 160 may verify that the replacement certificate identified by the replacement certificate identifier 215, i.e., the new active root certificate, corresponds to one of the N signatures (e.g., 230 or 231 on FIG. 2) of the message 200. In the example shown on FIG. 2, the replacement certificate identified by the replacement certificate identifier 215 is root certificate B. It corresponds to Signature 1, shown as 230 on FIG. 2.

If any of the verifications performed at any of steps 320-340 fails, the supervisor 160 may not perform any additional replacement operations but, may, in some embodiments, at step 350, attempt to notify (directly or indirectly via one or more additional servers) the CA 100 of a policy violation. Such a notification may include, for example, the replacement message 200 received by the electronic device 120 and any other appropriate information, such as the specific reason why the method failed. Otherwise, if all verifications performed at steps 320-340 pass successfully, the supervisor 160 may proceed to processing the certificate replacement.

FIGS. 3B and 3C show different methods for invalidating the certificate associated with the revoked root private key and replacing it with the new, active certificate. In the embodiment shown with respect to FIG. 3B, at step 360, the supervisor 160 may determine whether the currently active certificate should be revoked. This may be determined, for example, by comparing the revoked certificate identifier 210 to the certificate identifier of the current active certificate. For example, on FIG. 2, the revoked certificate identifier 210 lists root certificate A as the certificate to be revoked. Attribute storage 142 shows the status of root certificate A as active.

If the two identifiers match, the method may proceed to step 365 (FIG. 3B) and the supervisor 160 may update the status of the current certificate as revoked (e.g., within attribute storage 142). Thus, in the example shown on FIG. 2, the status of root certificate A should be updated within attribute storage 142 to revoked. If the two identifiers do not match—i.e., the certificate being revoked by the CA 100 is not the same as the active certificate within the electronic device 120—then at step 367 the supervisor 160 may update the status of the currently active certificate as dormant.

At step 370 (FIG. 3B), the supervisor 160 may update the status of the certificate referenced by replacement certificate identifier 215 (e.g., within attribute storage 142) as active, and at step 375, the supervisor 160 may begin using the new active root certificate for any certificate verification. In the example shown on FIG. 2, root certificate B is identified by the replacement certificate identifier 215; as a result, its status within attribute storage 142 should be updated to active.

In another embodiment, the certificate associated with the revoked root private key may be invalidated and replaced as shown on FIG. 3C. Many of the steps described with respect to FIG. 3C are analogous to steps described with respect to 3B.

In the method described in FIG. 3C, after step 340 of FIG. 3A, at step 380, the supervisor 160 may determine whether the currently active certificate should be revoked. This may be determined, for example, by comparing the revoked certificate identifier 210 to the certificate identifier of the current active certificate. For example, on FIG. 2, the revoked certificate identifier 210 lists root certificate A as the certificate to be revoked. Attribute storage 142 shows the status of root certificate A as active.

If the two identifiers match, the method may proceed to step 382 and the supervisor 160 may update the status of the current certificate as revoked (e.g., within attribute storage 142). Thus, in the example shown on FIG. 2, the status of root certificate A should be updated within attribute storage 142 to revoked.

At step 384 (FIG. 3C), the supervisor 160 may update the status of the certificate referenced by replacement certificate identifier 215 (e.g., within attribute storage 142) as active, and at step 386, the supervisor 160 may begin using the new active root certificate for any certificate verification. In the example shown on FIG. 2, root certificate B is identified by the replacement certificate identifier 215; as a result, its status within attribute storage 142 should be updated to active.

If, however, at step 380, the revoked certificate identifier 210 and the certificate identifier of the current active certificate do not match—i.e., the certificate being revoked by the CA 100 is not the same as the active certificate within the electronic device 120—then the supervisor 160 may not perform any replacement operations but, in some embodiments, may, at step 390, attempt to notify (directly or indirectly via one or more additional servers) the CA 100 of the inconsistency of the replacement message 200 with the present status of certificates within the electronic device 120. This notification may include the present replacement message 200 as well as the immediately preceding replacement message 200 based on which the last active certificate received its status (to the extent that such an immediately preceding replacement message may exists).

The exemplary method described with respect to FIGS. 3A-3C showed how a single private root key 102 may be replaced according to the present disclosure. Thus, if only one private root key 102 has been compromised—assuming that the CA 100 knows with specificity which private root key 102 has been compromised—the CA 100 may execute the replacement procedure described with respect to FIGS. 3A-3C. However, as will be described below, this method may be modified to replace multiple root certificates.

Figure 4:
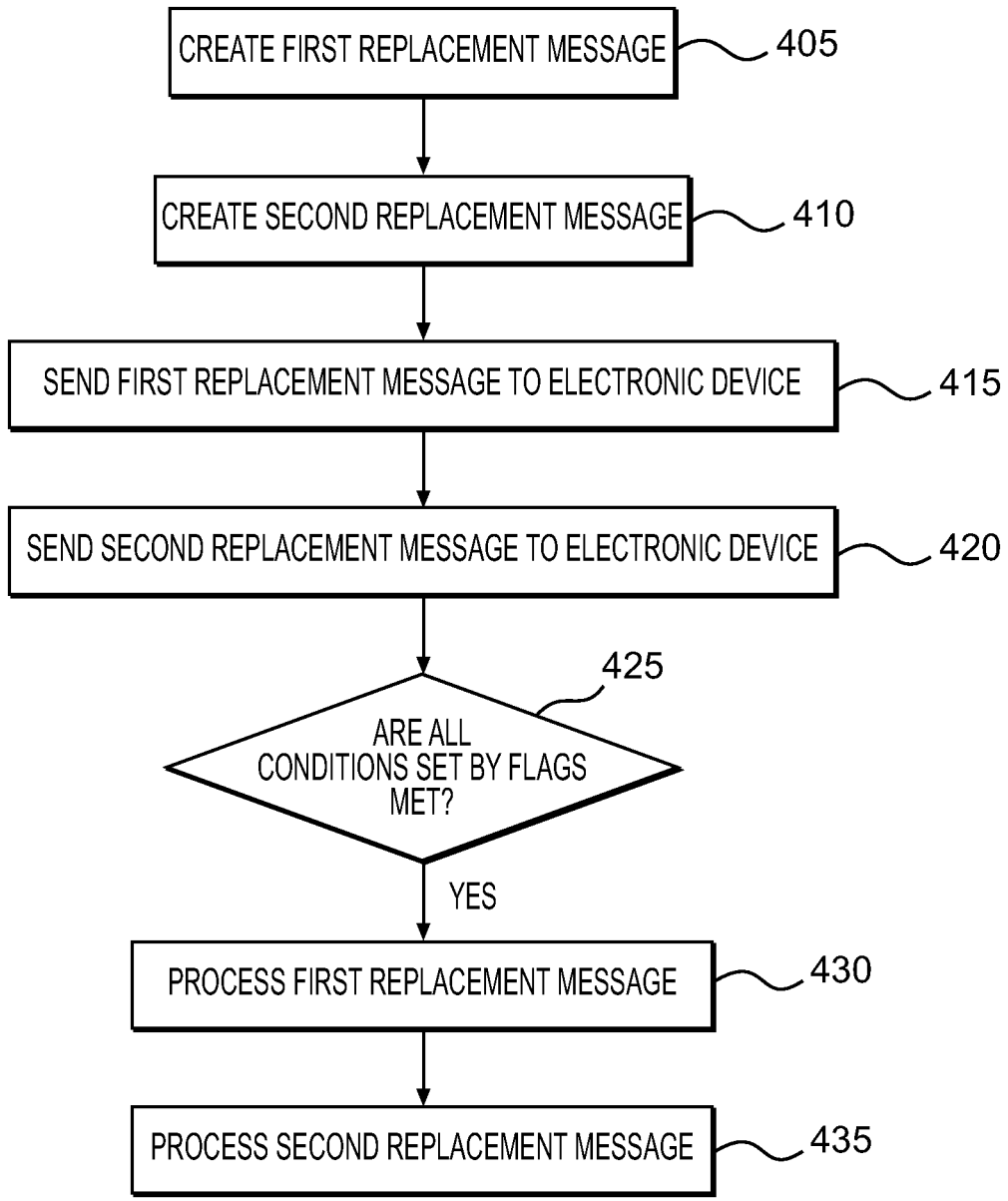
FIG. 4 shows an exemplary process by which multiple certificates may be replaced within an electronic device.
Figure 5:
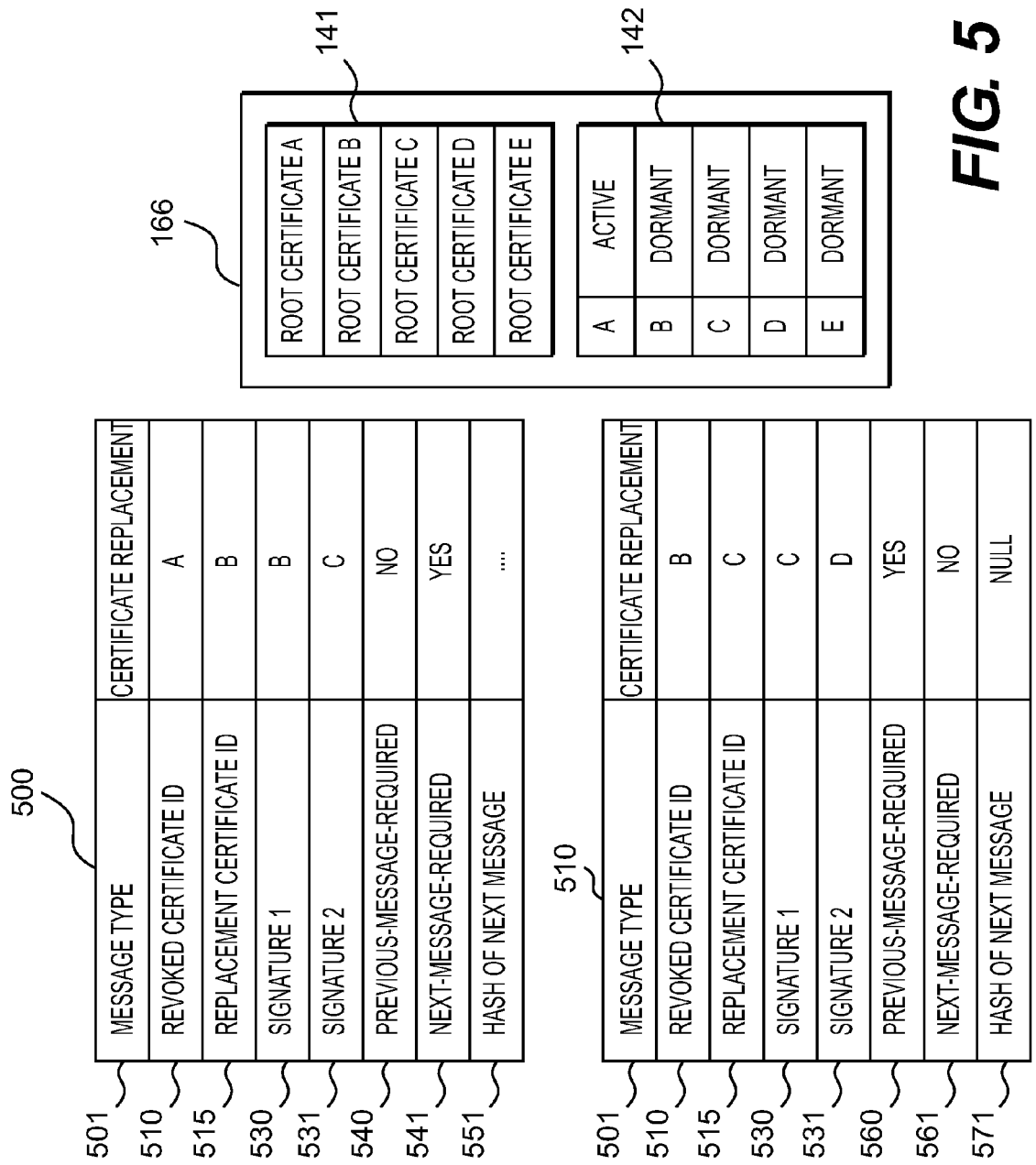
FIG. 5 shows two exemplary certificate replacement messages and the contents of an exemplary certificate management unit.

FIG. 4 shows an exemplary private root key replacement procedure for two root certificates, wherein one of the keys to be replaced is the active certificate. It will be understood, however, that the method described herein may be used for any number of certificates. As in the methods described with respect to FIGS. 3A-3C, the method described with respect to FIG. 4 assumes that the CA 100 knows with specificity which two private root keys must be replaced. FIG. 5 (analogous to FIG. 2) shows the contents of an exemplary certificate management unit 166 and the values of two certificate replacement messages. For the purposes of explanation, the processes described with respect to FIG. 4 will reference the values of the certificate replacement messages and certificate management unit 166 shown on FIG. 5. It will be understood, however, that these values are merely exemplary and the methods described are intended to work with any appropriate values.

As shown on FIG. 5, an exemplary certificate management unit 166 has five root certificates stored within certificate storage 141: root certificates A, B, C, D and E. The attribute storage 142 has the status of root certificate A listed as active, and the status of root certificates B, C, D and E as dormant. Root private keys corresponding to root certificates A and B are known by the CA 100 to be compromised.

At step 405, the CA 100 may create a first replacement message 500 invalidating the presently active certificate (i.e., the certificate corresponding to one of the two private root keys to be replaced) and replacing it with the certificate corresponding to the second compromised root key. This first replacement message 500 may be signed by the second compromised key and a third, non-compromised key. Thus, in the example shown on FIG. 5, root certificate A is the presently active certificate within the certificate management unit 166 and should be replaced by root certificate B. The first replacement message 500 has been signed by the root private keys corresponding to certificate B (compromised) and certificate C (non-compromised).

At step 410, the CA 100 may create a second replacement message 510 invalidating the presently active certificate (which, as described below, will be the replacement certificate identified in the first replacement message 500) and replacing it with a certificate corresponding to a non-compromised key. This second replacement message 510 may be signed by two non-compromised keys. Thus, in the example shown on FIG. 5, root certificate B is considered the presently active certificate and should be replaced by root certificate C. The second replacement message 510 has been signed by the private root keys corresponding to certificates C and D (both non-compromised).

It is noted that, in embodiments wherein one of the signatures of a replacement message may be created using the currently active private key, then the first certificate may be replaced using both of the compromised keys and the second certificate may be replaced using one of the compromised keys and a second, non-compromised key.

As shown on FIG. 5, each replacement message 500, 510 may possess some of the same fields as the replacement message 200 described with respect to FIG. 2, with the addition of three additional fields: a previous-message-required flag 540, 560, a next-message-required flag 541, 561, and a hash of the next message 551, 571. These fields may be used to enforce the integrity of replacement messages used to replace several certificates in a single process.

In one exemplary embodiment, the first replacement message 500 may set the next-message-required flag 541 to require a second, subsequent message, e.g., the second replacement message 510. (It will be understood that the value of this flag 541 may be anything suitable, including boolean values such as yes/no, 1/0, etc.) Accordingly, the first replacement message 500 may also include in field 551 a hash of the second replacement message 510. This hash may be a hash of the entire second replacement message 510, with or without its signature. As this is the first replacement message in the chain, the previous-message-required flag 540 may be set to indicate that no previous messages are required.

Similarly, the second replacement message 510 may be created such that the previous-message-required flag 560 is set to require a previous message, e.g., the first replacement message 500. The next-message-required flag 561 may be set to indicate that no subsequent messages are required, and the corresponding value of field 571 may be set to any value.

It will be understood that, in such an exemplary embodiment, it may be necessary to calculate any requisite hashes and signatures in a particular order. For example, it may be necessary to calculate the hash and signature for the last message in the message chain first, then for the penultimate message in the message chain, and so on.

It will further be understood that the foregoing description shown with respect to FIG. 5 is merely exemplary, and that the same effect may be achieved, for example, by using a hash of the previous message instead of a hash of the next message. In such embodiments, it may be preferable to calculate hashes and signatures starting with the first message and concluding with the last message in the message chain.

At step 415 (FIG. 4), the CA 100 may send the first replacement message 500 to the electronic device 120, and at step 420, the CA 100 may send the second replacement message 510 to the electronic device 120. Based on the message types of each message 500, 510, the supervisor 160 will be able to determine that these are certificate replacement messages, and proceed accordingly.

At step 425, the supervisor 160 may determine whether the conditions set by the flags in each of the two replacement messages (e.g., 540, 541, 560 and 561) have been met. For example, the supervisor 160, noting that the first replacement message 500 has the next-message-required flag 541 set to require to a subsequent message, may confirm that (i) it did receive a second replacement message 510, and (ii) the hash of the second replacement message 510 has the same value as the value received in data field 551 of the first replacement message 500.

Similarly, noting that the second replacement message 510 has the previous-message-required flag 540 set to require a previous message, the supervisor 160 may confirm that it received a first replacement message 500.

If all the conditions set by the flags have been met at step 425, at step 430, the supervisor 160 may process the first replacement message 500 (e.g., as described with respect to FIGS. 3A-3C, above), and at step 435, the supervisor 160 may process the second replacement message 510. In the example shown on FIG. 5, upon completion of step 435, both certificates A and B have been replaced, and certificate C is the presently active certificate.

In embodiments using this structure, the sequence of messages effectively forms a "message chain" (not to be confused with a traditional "certificate chain"). In certain embodiments, it may be desirable to process these messages atomically, wherein messages are linked together to ensure that they cannot be processed separately. Rather, either an entire chain of messages may be processed together, or, if, for some reason, one message in the chain is invalid, none of the messages are processed. In this sense, each message chain can be considered atomic, or indivisible, for processing, and the electronic device 120 cannot be left in an intermediate state. Either (i) the state of the root public keys should be changed so as to give effect to all messages in the chain, or (ii) the state of the root public keys should not change at all.

In other embodiments, it may be desirable to use a second type of atomic message processing, such that if one of the messages in the message chain is invalid (i.e., the validity conditions described above are not satisfied), the invalid message in message chain is skipped. Those messages which are valid are used to form a second (temporary) message chain, comprising the valid messages in the original chain, and in the same order, but without the invalid messages. Then this second temporary message chain is processed atomically, as described above. This logic may be useful in some scenarios, such as, for example, if different existing devices 120 have different states (which may happen, for example, as a result of certain attacks on a system which has multiple devices 120). This second type of atomic processing may be used to apply the same chain to bring devices 120—which are in different, invalid states—to a single valid state.

Such an exemplary scenario may be as follows: An attacker may have control of two dormant keys D1 and D2, and may issue two sets of messages using these dormant keys: (a) to some devices 120, the attacker may issue messages replacing the active key A with dormant key D1, and (b) to other devices 120, the attacker may issue messages replacing the active key A with dormant key D2. Accordingly, some devices 120 will have key D1 as active, and others will have key D2 as active. To remedy this situation, if keys C1 and C2 are still not compromised, the following message chain may be issued by the CA to all devices: (a) "replace D1 with C1" (signed with C1 and C2), and (b) "replace D2 with C1" (signed with C1 and C2). If processed as described above, using this second type of atomic processing, in devices where D1 was the active key, part (b) of the message chain will be skipped; in devices where D2 was the active key, part (a) of the message chain will be skipped. As a result, all devices will be brought to the same valid state (with C1 being the active key) regardless of whether a specific device has D1 or D2 as an active key.

Figure 6:
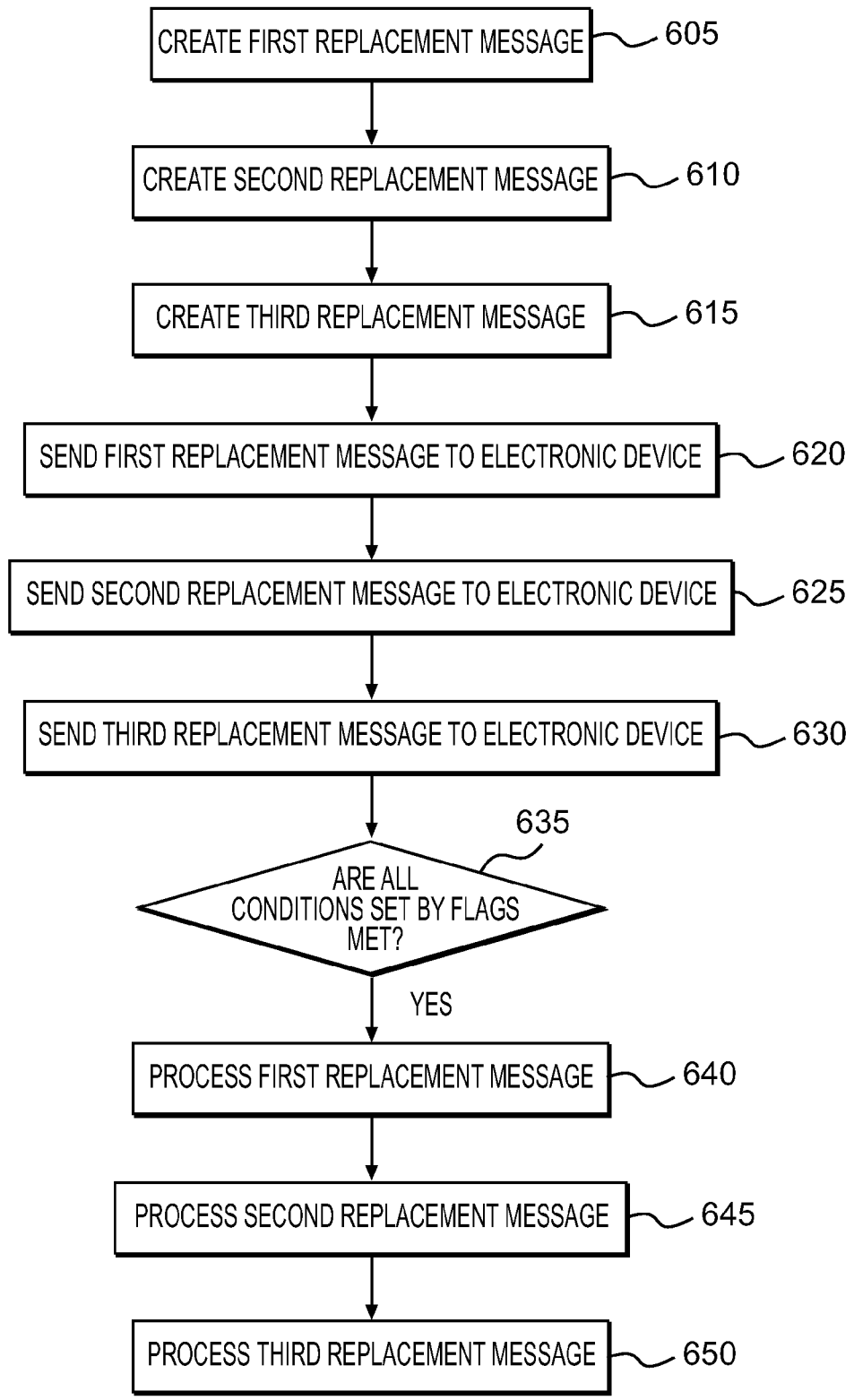
FIG. 6 shows an exemplary process by which multiple certificates may be replaced within an electronic device.

The method described with respect to FIG. 4 assumed that one of the two compromised private root keys corresponded to the then-active certificate within the electronic device 120. FIG. 6 shows an exemplary method by which certificates may be replaced when the two compromised private keys 102 correspond to dormant certificates within the electronic device 120. As in FIG. 4, FIG. 6 shows an exemplary private root key replacement procedure for two root certificates; however, it will be understood that the method described therein may be used for any number of certificates.

At step 605, the CA 100 may create a first replacement message invalidating the presently active certificate (which does not correspond to one of the two private root keys to be replaced) and replacing it with the certificate corresponding to the first compromised root key. This first replacement message may be signed by the first and second compromised keys.

At step 610, the CA 100 may create a second replacement message invalidating the presently active certificate (which is the replacement certificate corresponding to the first compromised key and identified in the first replacement message) and replacing it with a certificate corresponding to the second compromised key. This second replacement message may be signed by the second compromised key and one non-compromised key.

At step 615, the CA 100 may create a third replacement message invalidating the presently active certificate (which is the replacement certificate corresponding to the second compromised key and identified in the second replacement message) and replacing it with a certificate corresponding to a non-compromised key. This third replacement message may be signed by two non-compromised keys.

As in FIG. 4, these three replacement messages should make a sequence; as a result, each replacement message should have its previous-message-required and next-message-required flags (and next-message hash, where applicable) set accordingly.

At step 620, the CA 100 may send the first replacement message to the electronic device 120, at step 625, the CA 100 may send the second replacement message to the electronic device 120, and at step 630, the CA 100 may send the third replacement message to the electronic device.

At step 635, upon determining that each of these messages are replacement messages, the supervisor 160 may determine whether the conditions set by the flags in each of the three replacement messages have been met. For example, the supervisor 160, noting that the first replacement message has the next-message-required flag set to require to a subsequent message, may confirm that (i) it did receive a second replacement message, and (ii) the hash of the second replacement message has the same value as the value received in the hash data field of the first replacement message. This same procedure may be performed for the second and third replacement messages.

If all the conditions set by the flags have been met at step 635, at step 640, the supervisor 160 may process the first replacement message (e.g., as described with respect to FIGS. 3A-3C, above), at step 645, the supervisor 160 may process the second replacement message, and at step 650, the supervisor 160 may process the third replacement message. At the end of step 650, three keys will have been replaced (the active key and the two compromised, dormant keys), and a non-compromised key will have been activated.

The methods and data structures described with respect to FIGS. 2-6 showed how one or more certificates may be replaced. In the exemplary method shown with respect to FIG. 6, in which two dormant certificates are replaced, however, in the course of invalidating the two dormant keys, the then-current active key was also revoked. Accordingly, in certain embodiments, it may be preferable to perform one or more procedures which simply revoke (without replacement of) a single private root key.

It will be understood that it may be desirable to restrict the use of the revocation procedures described herein to only dormant root keys; i.e., it may not be desirable to use a revocation procedure with respect to an active root key. If a revocation procedure were to be used with respect to an active root key—without a subsequent replacement of the revoked key—systems using these certificates would have no active key to use for certificate verifications.

In one embodiment, the system may be configured to process a dormant certificate revocation based on one or more "self-revocation notes," which may be any type of self-authenticating message suitable for identifying a private root key 102 which should be revoked. A self-revocation note can be prepared by a CA 100 in advance of performing any revocation operations. For example, in certain embodiments, a self-revocation note may be prepared immediately following the production of a root private key. Although self-revocation notes 700 may be prepared by the CA 100 in advance, it may be desirable to store these notes 700 separately from the keys 101 themselves so as to reduce the possibility of a simultaneous loss of both a key 102 and the corresponding self-revocation note 700. In certain embodiments, each self-revocation note may be stored as securely as its corresponding private root key is stored.

Figure 7:
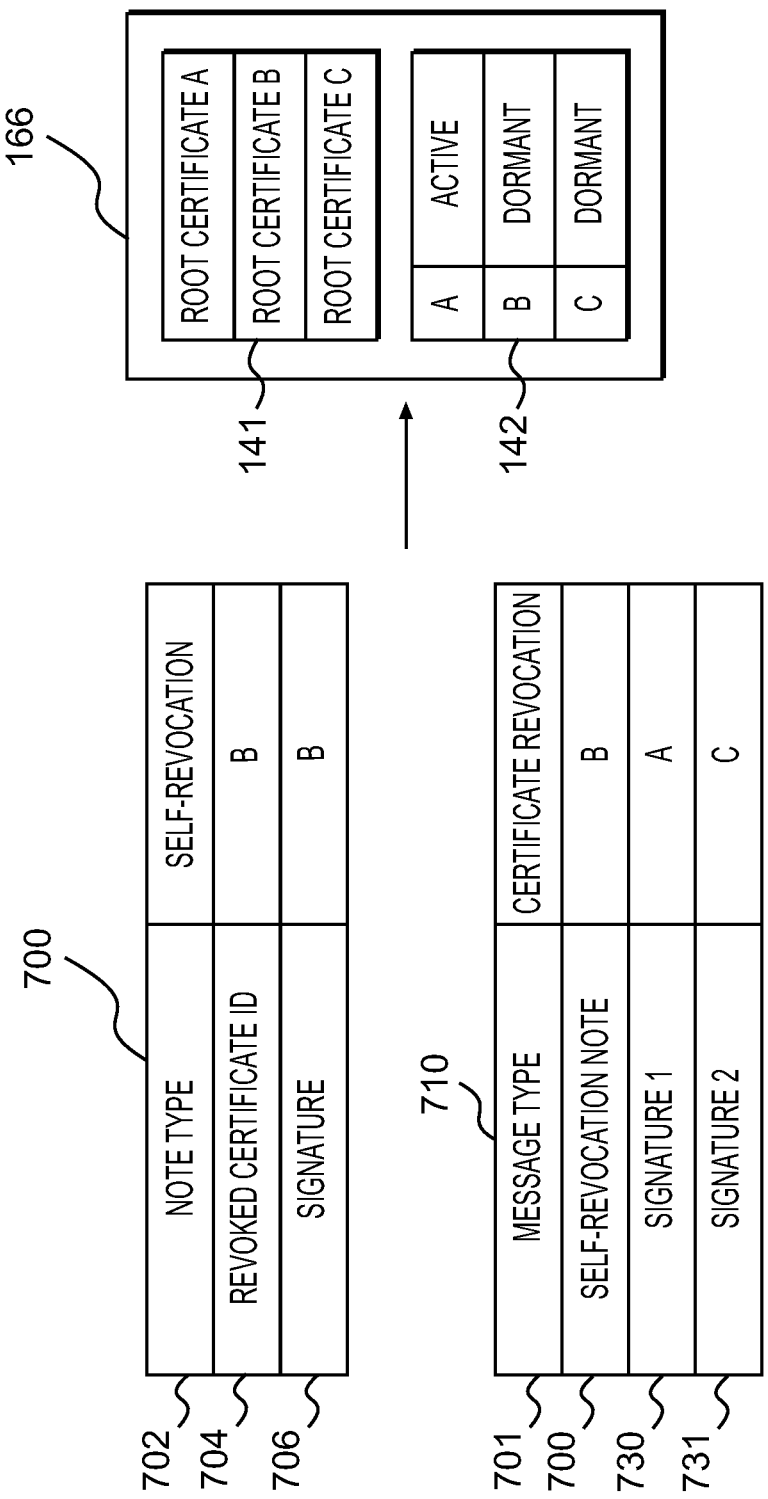
FIG. 7 shows an exemplary self-revocation note, a dormant certificate revocation message and the contents of an exemplary certificate management unit.
Figure 8:
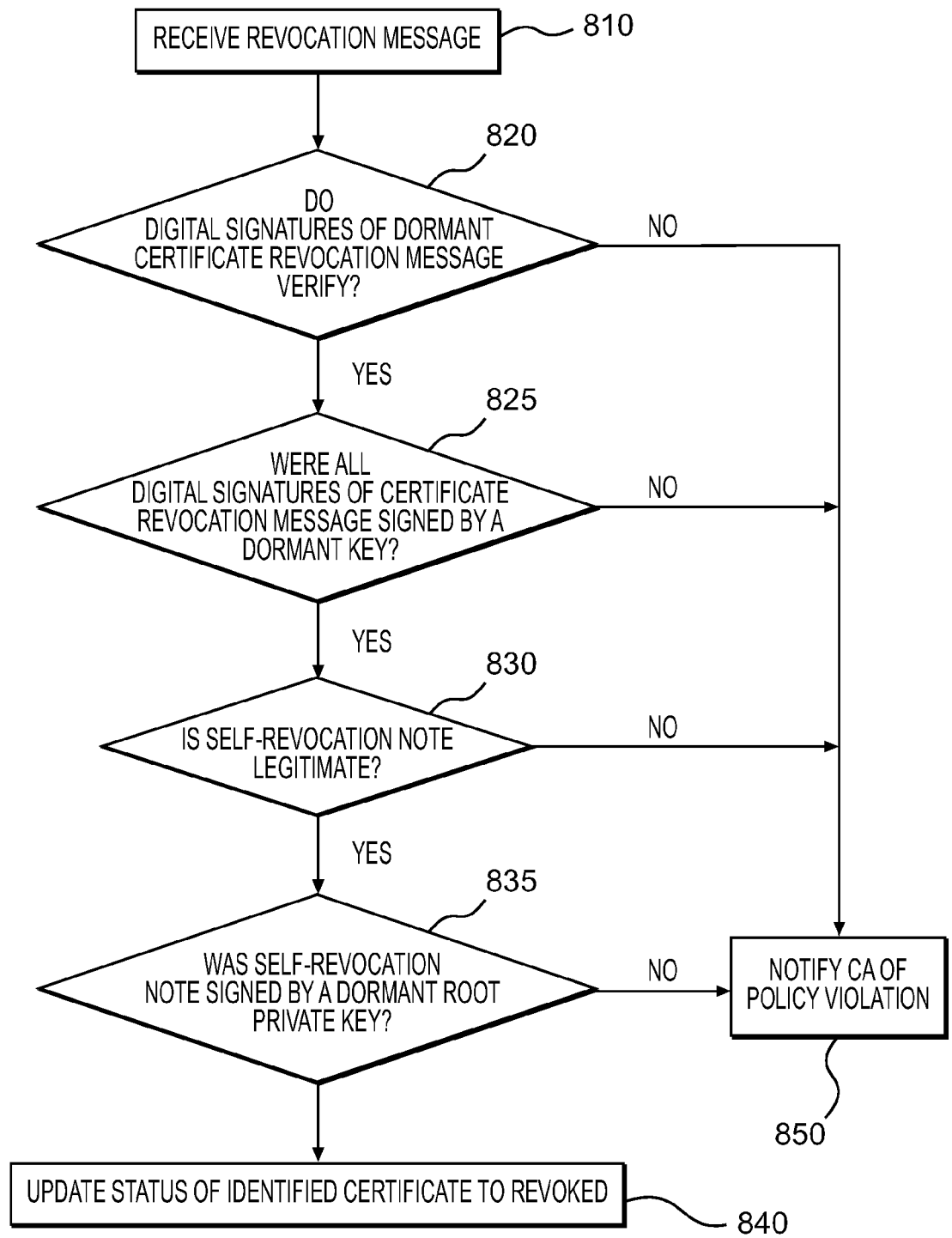
FIG. 8 shows an exemplary process by which a dormant certificate may be revoked within an electronic device.

FIG. 7 shows an exemplary self-revocation note 700, a corresponding dormant certificate revocation message 710, and the contents of an exemplary certificate management unit 166. FIG. 8 shows an exemplary process by which a dormant certificate may be replaced in an electronic device 120 upon revocation of the corresponding private root key 101 by a CA 100. For the purposes of explanation, the process described with respect to FIG. 8 will reference the values of the self-revocation note 700, dormant certificate revocation message 710 and certificate management unit 166 shown on FIG. 7. It will be understood, however, that these values are merely exemplary and the methods described are intended to work with any appropriate values.

As shown on FIG. 7, a self-revocation note 700 may have three fields: (1) a note type 702, which may be any suitable data used to indicate that this is a self-revocation note 700 (such as the string "Self-Revocation", as shown on FIG. 7); (2) a revoked certificate identifier 704, which may identify the certificate corresponding to the dormant root private key 102 to be revoked; and (3) a self-revocation note digital signature 706, which may be a digital signature encompassing both the note type 702 and the revoked certificate identifier 704, created using the private root key 102 corresponding to the revoked certificate identifier 704. For example, in the exemplary embodiment shown on FIG. 7, certificate B is to be revoked, and the self-revocation note 700 includes a digital signature created using the root private key corresponding to certificate B.

FIG. 7 also shows an exemplary dormant key revocation message 710 which may be used in conjunction with a self-revocation note 700. As shown on FIG. 7, this dormant key revocation message may comprise: (1) message type 701, which may be any suitable data used to indicate that this is a revocation message 710; (2) a self-revocation note 700, identifying the certificate corresponding to the dormant key to be revoked; and (3) two digital signatures, "Signature 1" 730 and "Signature 2" 731, signing the dormant key revocation message 710. Although the foregoing example describes the use of two digital signatures, it will be understood that the invention is not limited to two signatures, and that in some embodiments the number of signatures can be different, such as one, or three or more.

In one embodiment, it may be desirable to sign the dormant key revocation message 710 using two dormant keys. In another embodiment, one of the signing keys may be a currently active key. For example, in the exemplary embodiment shown on FIG. 7, certificate B is to be revoked, and the dormant key revocation message 710 has been signed by the currently active key (i.e., the root private key 102 corresponding to certificate A) and a dormant key (i.e., the root private key 102 corresponding to certificate C).

In some embodiments, instead of using the self-revocation note 700 to identify the certificate to be revoked, the dormant key revocation message 710 may comprise a revoked dormant certificate identifier (not shown). In such embodiments, the dormant key revocation message 710 should be accompanied by the self-revocation note 700 that corresponds to the certificate being revoked.

It will be understood that, for the purpose of the presently described exemplary embodiment, there is no "replacement certificate identifier" (as described with respect to FIG. 2), because there is no need to replace the currently active certificate; only a dormant, i.e., unused, certificate is being revoked.

FIG. 8 shows an exemplary process by which a currently dormant certificate may be revoked in an electronic device 120 upon revocation of the corresponding private root key 101 by a CA 100. Again, it will be understood that, for the purpose of the presently described exemplary method, there is no need to replace the currently active certificate, as only a dormant certificate is being revoked.

At step 810, the supervisor 160 may receive a dormant certificate revocation message 710 and an associated self-revocation note 700 (FIG. 7). This message may be sent to the supervisor 160 directly by the CA 100 or via one or more intermediate servers, e.g., server 110, and may be identified as a dormant certificate revocation message 710 based on the message type 701.

Steps 820-835, each of which will be described in greater detail below, may be used to verify the authenticity of the dormant certificate revocation message 710 and the associated self-revocation note 700.

At step 820, the supervisor 160 may verify the digital signatures received within the dormant certificate revocation message, e.g., Signature 1 730 and Signature 2 731. This may include a number of sub-steps, including verifying that the dormant certificate revocation message 710 includes the correct number of signatures and that the signing keys were not previously revoked, as described, for example, with respect to steps 320-326 shown on FIG. 3.

In embodiments requiring all digital signatures in the dormant certificate revocation message to be signed by dormant keys, at step 825, the supervisor 160 may verify that all digital signatures in the dormant certificate revocation message were actually signed by dormant keys.

At step 830, the supervisor 160 may verify that it has received a legitimate self-revocation note 700. This may include verifying that the note type 702 describes the received data as a self revocation note 700, and may further include verifying that the digital signature 706 (within the self-revocation note 700) and the stored certificate corresponding to the private root key identified by revoked dormant certificate identifier 704 match, i.e., that the self-revocation note 700 was actually digitally signed by the key to be revoked.

At step 835, the supervisor 160 may confirm that the certificate corresponding to the identified key is dormant.

If any of the verifications performed at any of steps 820-835 fail, the supervisor 160 may not perform any additional revocation operations but, may, at step 850, attempt to notify (directly or indirectly via one or more additional servers) the CA 100 of a policy violation. Such a notification may include, for example, the dormant certificate revocation message 710 and the self-revocation note 700 received by the electronic device 120 and any other appropriate information, such as the specific reason why the method failed. Otherwise, if all verifications performed at steps 820-835 pass successfully, at step 840, the supervisor 160 may change the status of the identified certificate to revoked.

It will be understood that, even if a private root key 102 is stolen (e.g., such that the key 102 is in the possession of an attacker, but not in the possession of the CA) or destroyed, so long as its self-revocation note 700 remains in the possession of the respective CA 100, this self-revocation note 700 can be used to revoke the corresponding digital certificate. Additionally, even if an attacker has two keys, the attacker cannot revoke any other dormant keys without a self-revocation note for that other key.

The foregoing description with respect to FIGS. 7 and 8 described a process by which a single dormant key can be directly revoked using a self-revocation note 700. However, it may be desirable, in certain circumstances, to use self-revocation notes 700 to revoke multiple dormant keys. In certain embodiments, the method shown with respect to FIG. 8 might simply be repeated for each dormant key to be revoked. In other embodiments, it may be preferable to use a variant on the method described with respect to FIG. 6, wherein each dormant key revocation message 710 may further comprise next-message-required, previous-message-required, and next-message-hash fields, e.g., as described with respect to FIG. 5.

Since the revocation of keys will reduce the number of remaining valid keys, in some embodiments it may be desirable to provide a mechanism by which a new root private key can be added into the system, and a corresponding certificate can be uploaded into the electronic device 120. It will be understood that, in such embodiments, the certificate storage 141 may need to be writeable (i.e., not read-only).

Figure 9:
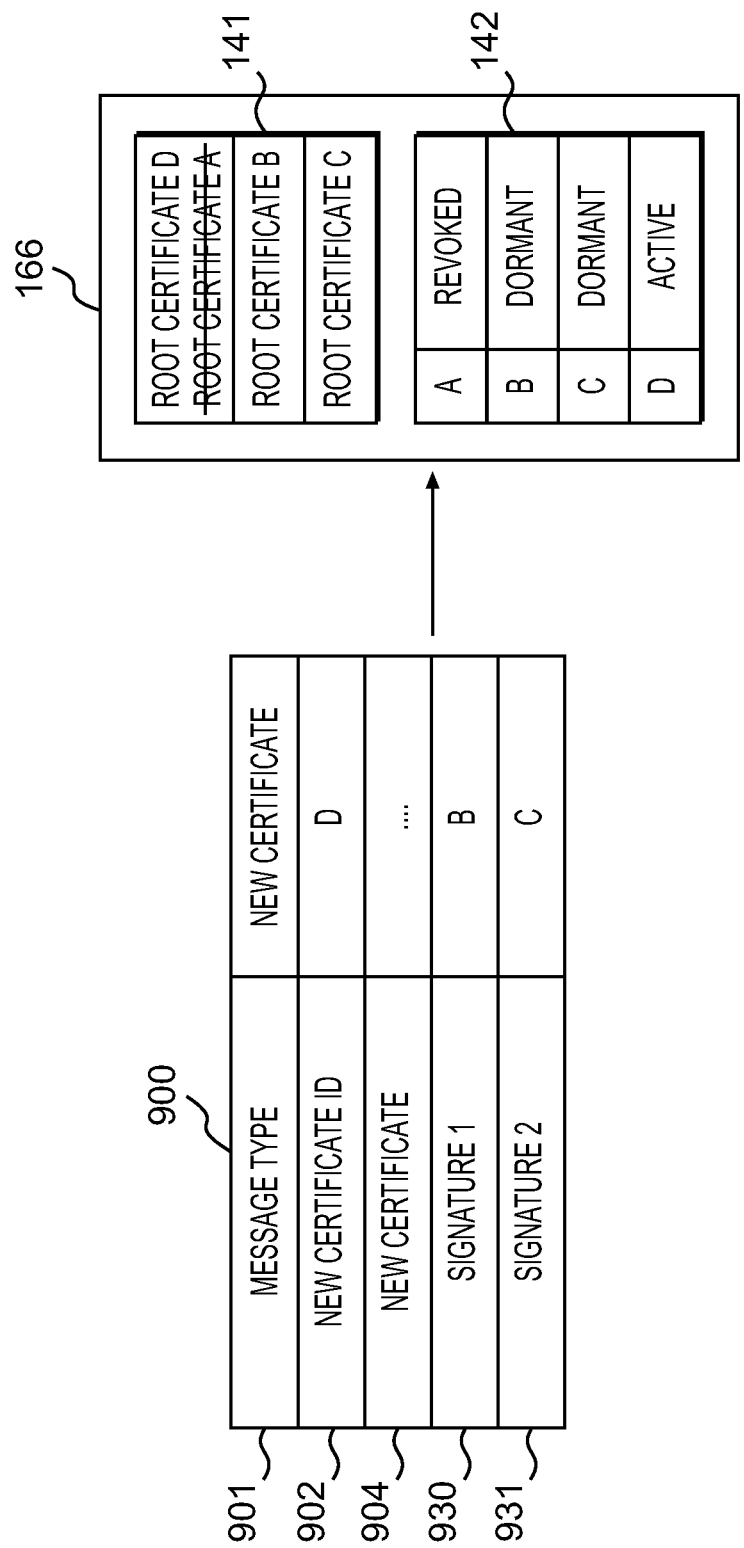
FIG. 9 shows an exemplary new certificate message and the contents of an exemplary certificate management unit.
Figure 10:
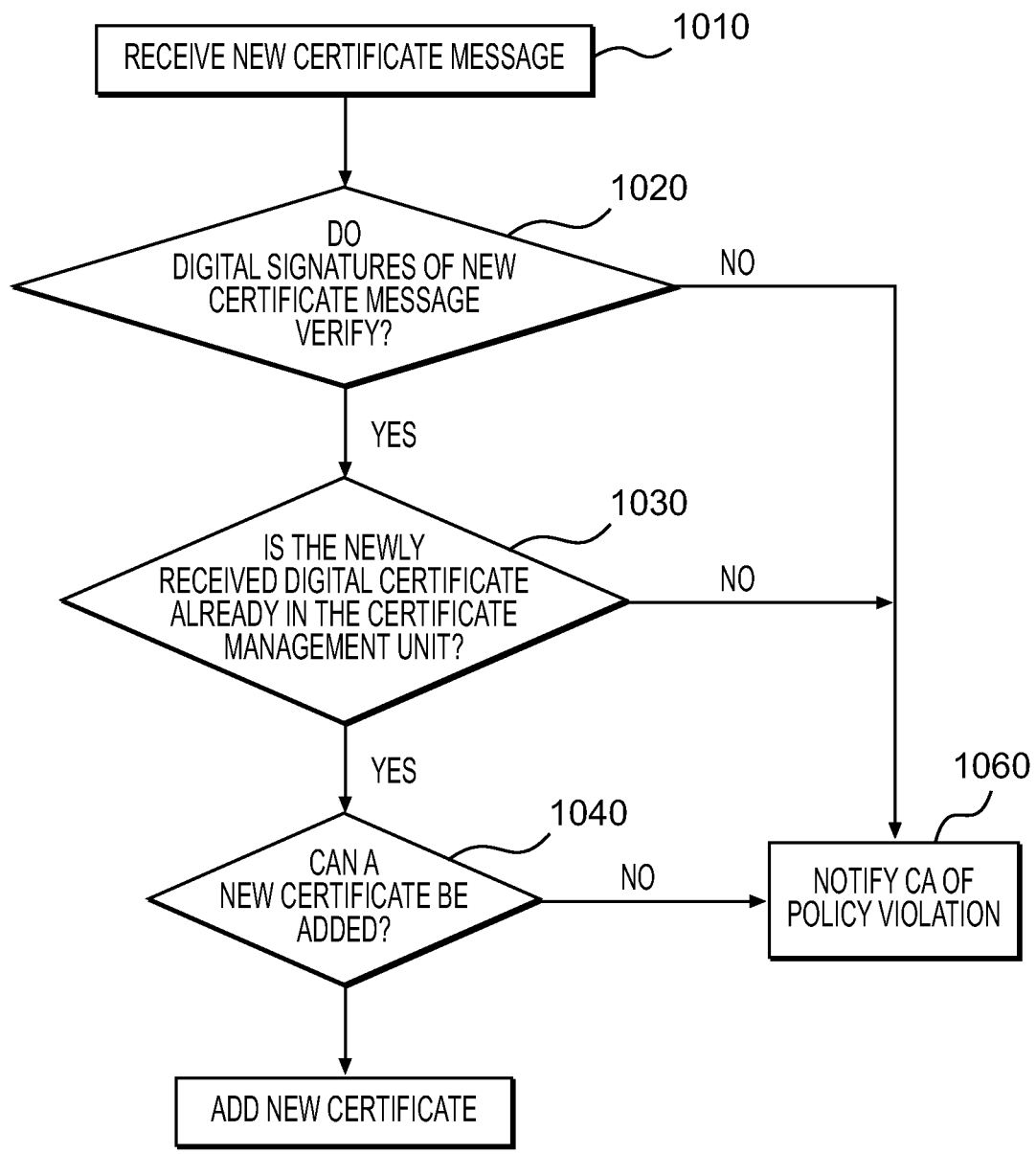
FIG. 10 shows an exemplary process by which a new certificate may be added to an electronic device.

FIG. 9 shows an exemplary new certificate message 900 and the contents of an exemplary certificate management unit 166. FIG. 10 shows an exemplary process by which a new certificate may be added to an electronic device 120 upon creation of a new private root key 101 by a CA 100. For the purposes of explanation, the process described with respect to FIG. 10 will reference the values of the new certificate message 900 and certificate management unit 166 shown on FIG. 9. It will be understood, however, that these values are merely exemplary and the methods described are intended to work with any appropriate values.

As shown on FIG. 9, a new certificate message 900 may have four or more fields: (1) message type 901, which may be any suitable data used to indicate that this is a revocation message 900; (2) a new certificate identifier 902, which may identify the new certificate corresponding to the new root private key 102; (3) the new certificate (or root public key) 904; and (4) one or more digital signatures, wherein one or more existing private root keys 102 may be used to digitally sign the new certificate identifier 902 and new certificate 904. For example, to enhance the overall security of the system, in one exemplary embodiment it may be preferable to digitally sign the new certificate identifier 902 and the new certificate 904 with all of the remaining, unrevoked keys (whether active or dormant). In the exemplary embodiment shown on FIG. 9, certificate A has been revoked, and the new certificate message 900, identifying the new certificate as certificate D, has been signed by the two remaining root private keys corresponding to certificates B and C (shown as Signature 1 930 and Signature 2 931, respectively).

Since the capacity of the certificate management unit 166 may be limited, in certain embodiments, at least one key in the certificate management unit 166 should have a "revoked" status, so that when a new certificate message 900 is received, the new certificate 904 will be stored in place of a previously revoked key. To ensure this property, in some such embodiments, the new certificate message 900 may be sent immediately following a certificate replacement or revocation message.

FIG. 10 shows an exemplary process by which a new certificate may be added to an electronic device 120 following generation of a new private root key 101 by a CA 100.

At step 1010, the supervisor 160 may receive a new certificate message 900 (FIG. 9). This message may be sent directly to the supervisor 160 by the CA 100 or via one or more intermediate servers, e.g., server 110, and may be identified as a new certificate message 900 by the message type 901.

Steps 1020-1040, each of which will be described in greater detail below, may be used to verify the authenticity of the new certificate message 900.

At step 1020, the supervisor 160 may verify the digital signatures received within the new certificate message, e.g., Signature 1 930 and Signature 2 931. This may include a number of sub-steps, including verifying that the new certificate message 900 included the correct number of signatures (e.g., all—not just a subset of—non-revoked keys) and that the signing keys were not previously revoked, as described, for example, with respect to steps 320-326 shown on FIG. 3. For example, in the embodiment shown on FIG. 9, the supervisor 160 may confirm that (i) the new certificate message 900 was digitally signed using root private keys 102 corresponding to both certificate B and certificate C, and that (ii) it was not signed using the root private key 102 corresponding to certificate A (which had previously been revoked, as shown in field 142).

At step 1030, the supervisor 160 may verify that the newly received digital certificate 904 has not previously been stored within the certificate management unit 166.

At step 1040, the supervisor 160 may confirm that a new certificate can be added to the certificate management unit 166. For example, in certain embodiments, the certificate management unit 166 may confirm that it has at least one "revoked" certificate that can be replaced by a new one.

If any of the verifications performed at any of steps 1020-1040 fail, the supervisor 160 may not perform any additional updates but, may, in some embodiments, at step 1060, attempt to notify (directly or indirectly via one or more additional servers) the CA 100 of a policy violation. Such a notification may include, for example, the new certificate message 900 and any other appropriate information, such as the specific reason why the method failed. Otherwise, if all verifications performed at steps 1020-1040 pass successfully, at step 1050, the supervisor 160 may add the new certificate to the certificate management unit 166 with a status of "dormant".

From time to time it may be the case that a root private key 102 is accidentally (or otherwise) destroyed. If the destroyed key is a dormant key, the CA 100 may just never make that key active. If, however, it is an active key which has been destroyed (or stolen), the device 120 can still be restored to a manageable state because the methods described herein do not require the use of the active key for its revocation. For example, using the method described with respect to FIGS. 3A-3C, the CA 100 may select a new private root key 102 to activate, and may send a message to all electronic devices 120 to revoke and replace the active certificate wherein the message has been digitally signed by, for example, the new key and one or more dormant keys. In other words, the active key that is lost and is being replaced is not necessary to revoke the corresponding certificate.

It should be understood that while the foregoing discussion assumed a single active key, the present disclosure also contemplates the use of multiple active keys. In these embodiments, several signatures may be needed to make a certificate issued by root keys valid. Active keys in these embodiments may be handled as described above.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of microprocessors, microcontrollers, field programmable gate arrays (FPGAs), application specific integrated circuits (ASICs), and/or System on a Chip (SoC)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. An apparatus, comprising:
   a non-volatile storage storing a plurality of root certificates, wherein at least one root certificate of the plurality of root certificates having an attribute of being active and at least another root certificate of the plurality of root certificates having an attribute of being dormant;
   a programmed logic circuit coupled to the non-volatile storage and configured to:
      receive a message identifying one of the plurality of root certificates stored in the non-volatile storage to be revoked;
      verify the message being signed by at least two private keys corresponding to two root certificates stored in the non-volatile storage and that at least one of the at least two private keys used to sign the message corresponds to root certificates stored in the non-volatile storage having an attribute of being dormant; and
      revoke the root certificate identified in the message.

2. The apparatus of claim 1, wherein the message is a replacement message that identifies a first root certificate to be revoked and a second root certificate to be activated.

3. The apparatus of claim 2, wherein the two root certificates used to verify the two private key signatures are the second root certificate and a third root certificate not having been revoked.

4. The apparatus of claim 2, wherein the two root certificates used to verify the two private key signatures are the first and second root certificates.

5. The apparatus of claim 2, wherein the replacement message is one replacement message in a chain of replacement messages that each identifies a root certificate to be revoked and another root certificate to be activated, and each replacement message in the chain includes a first field identifying whether a previous message is required, and a second field identifying whether a next message is required.

6. The apparatus of claim 5, wherein each replacement message in the chain includes a third field for a hash of the next message.

7. The apparatus of claim 5, wherein each replacement message in the chain includes a third field for a hash of the previous message.

8. The apparatus of claim 5, wherein the programmed logic circuit is further configured to process the chain of replacement messages atomically.

9. The apparatus of claim 2, wherein the non-volatile storage has a writable space to store the plurality of root certificates.

10. The apparatus of claim 9, wherein the programmed logic circuit is further configured to:
receive a new certificate message that includes a new certificate identifier, a new certificate and one or more digital signatures;
verify the one or more digital signatures signing the new certificate message being generated by private keys corresponding to root certificates stored in the non-volatile storage; and
add the new certificate to the non-volatile storage.

11. The apparatus of claim 10, wherein the one or more digital signatures are generated by private keys corresponding to all root certificates stored in the non-volatile storage that are not revoked.

12. The apparatus of claim 1, wherein the programmed logic circuit is further configured to verify that all private keys used to sign the message correspond to root certificates stored in the non-volatile storage having an attribute of being dormant.

13. The apparatus of claim 1, wherein the programmed logic circuit is further configured to verify that one private key used to sign the message corresponds to a root certificate of the plurality of root certificates stored in the non-volatile storage having an attribute of being active and all other private keys used to sign the message correspond to root certificates stored in the non-volatile storage having an attribute of being dormant.

14. The apparatus of claim 1, wherein the message is a dormant certificate revocation message that includes a self revocation note, the self revocation note contains an identifier of a root certificate to be revoked and a signature signed by a private key corresponding to the identified root certificate to be revoked.

15. The apparatus of claim 1, wherein the non-volatile storage has a read-only space to store the plurality of root certificates and a writable space to store associated attributes.

16. The apparatus of claim 1, wherein the programmed logic circuit is one or any combination of a microprocessor, microcontroller, field programmable gate array (FPGA), application specific integrated circuit (ASIC), or System on a Chip (SoC).

17. A computer-implemented method, comprising:
storing, in a non-volatile storage of an apparatus, a plurality of root certificates, wherein at least one root certificate of the plurality of root certificates having an attribute of being active and another root certificate of the plurality of root certificates having an attribute of being dormant;
receiving a message identifying one of the plurality of root certificates stored in the non-volatile storage to be revoked;
verifying the message being signed by at least two private keys corresponding to two root certificates stored in the non-volatile storage and that at least one of the at least two private keys used to sign the message corresponds to root certificates stored in the non-volatile storage having an attribute of being dormant; and
revoking the root certificate identified in the message.

18. The computer-implemented method of claim 17, wherein the message is a replacement message that identifies a first root certificate to be revoked and a second root certificate to be activated.

19. The computer-implemented method of claim 18, wherein the two root certificates used to verify the two private key signatures are the second root certificate and a third root certificate not having been revoked.

20. The computer-implemented method of claim 18, wherein the two root certificates used to verify the two private key signatures are the first and second root certificates.

21. The computer-implemented method of claim 18, wherein the replacement message is one replacement message in a chain of replacement messages that each identifies a root certificate to be revoked and another root certificate to be activated, and each replacement message in the chain includes a first field identifying whether a previous message is required, a second field identifying whether a next message is required.

22. The computer-implemented method of claim 21, wherein each replacement message in the chain includes a third field for a hash of the next message.

23. The computer-implemented method of claim 21, wherein each replacement message in the chain includes a third field for a hash of the previous message.

24. The computer-implemented method of claim 21, further comprising processing the chain of replacement messages atomically.

25. The computer-implemented method of claim 17, further comprising verifying that all private keys used to sign the message correspond to root certificates stored in the non-volatile storage having an attribute of being dormant.

26. The computer-implemented method of claim 17, further comprising verifying that one private key used to sign the message corresponds to a root certificate of the plurality of root certificates stored in the non-volatile storage having an attribute of being active and all other private keys used to sign the message correspond to root certificates stored in the non-volatile storage having an attribute of being dormant.

27. The computer-implemented method of claim 17, wherein the message is a dormant certificate revocation message that includes a self revocation note, the self revocation note contains an identifier of a root certificate to be revoked and a signature signed by a private key corresponding to the identified root certificate to be revoked.

28. The computer-implemented method of claim 17, further comprising:
receiving a new certificate message that includes a new certificate identifier, a new certificate and one or more digital signatures;
verifying the one or more digital signatures signing the new certificate message being generated by private keys corresponding to root certificates stored in the non-volatile storage; and
adding the new certificate to the non-volatile storage.

29. The computer-implemented method of claim 28, wherein one or more digital signatures are generated by private keys corresponding to all root certificates stored in the non-volatile storage that are not revoked.

30. A computer-implemented method, comprising:
determining, at a certificate authority, a first private key needs to be revoked;
generating a message that identifies a first root certificate to be revoked at a client device, the first root certificate corresponding to the first private key;
signing the message by at least two private keys corresponding to two root certificates stored at the client device, wherein at least one of the at least two private keys used to sign the message corresponds to a root certificate stored at the client device having an attribute of being dormant; and sending the signed message to the client device.

31. The computer-implemented method of claim 30, wherein the message is a replacement message that identifies a second root certificate to be activated, the second root certificate corresponds to a second private key at the certificate authority.

32. The computer-implemented method of claim 31, wherein one of the at least two private keys signing the message is the second private key.

33. The computer-implemented method of claim 31, wherein one of the at least two private keys signing the message is the first private key.

34. The computer-implemented method of claim 31, wherein the replacement message is one replacement message in a chain of replacement messages that each identifies a root certificate to be revoked and another root certificate to be activated, and each replacement message in the chain includes a first field identifying whether a previous message is required, a second field identifying whether a next message is required.

35. The computer-implemented method of claim 34, wherein each replacement message in the chain includes a third field for a hash of the next message.

36. The computer-implemented method of claim 34, wherein each replacement message in the chain includes a third field for a hash of the previous message.

37. The computer-implemented method of claim 30, wherein all of the at least two private keys signing the message correspond to root certificates stored at the client device having an attribute of being dormant.

38. The computer-implemented method of claim 30, wherein the message is a dormant certificate revocation message that includes a self revocation note, the self revocation note contains an identifier of the first root certificate and a signature signed by the first private key.

39. The computer-implemented method of claim 30, wherein at least one of the at least two private keys signing the message corresponds to a root certificate stored at the client device having an attribute of being active and all other private keys used to sign the message correspond to root certificates stored at the client device having an attribute of being dormant.

40. An apparatus, comprising:
a non-volatile storage storing a plurality of root certificates;
a programmed logic circuit coupled to the non-volatile storage and configured to:
receive a replacement message, wherein the received replacement is in a chain of replacement messages that each identifies a root certificate of the plurality of root certificates to be revoked and another root certificate of the plurality of root certificates to be activated, and each replacement message in the chain includes a first field identifying whether a previous message is required and a second field identifying whether a next message is required;
verify the replacement message being signed by at least two private keys corresponding to two root certificates stored in the non-volatile storage; and
revoke the root certificate identified in the replacement message.

41. The apparatus of claim 40, wherein each replacement message in the chain includes a third field for a hash of the next message.

42. The apparatus of claim 40, wherein each replacement message in the chain includes a third field for a hash of the previous message.

43. The apparatus of claim 40, wherein the programmed logic circuit is further configured to process the chain of replacement messages atomically.

44. A computer-implemented method, comprising:
storing, in a non-volatile storage of an apparatus, a plurality of root certificates;
receiving a replacement message, wherein the replacement message is one replacement message in a chain of replacement messages that each identifies a root certificate of the plurality of root certificates to be revoked and another root certificate of the plurality of root certificates to be activated, and each replacement message in the chain includes a first field identifying whether a previous message is required and a second field identifying whether a next message is required;
verifying the message being signed by at least two private keys corresponding to two root certificates stored in the non-volatile storage; and
revoking the root certificate identified in the message.

45. The computer-implemented method of claim 44, wherein each replacement message in the chain includes a third field for a hash of the next message.

46. The computer-implemented method of claim 44, wherein each replacement message in the chain includes a third field for a hash of the previous message.

47. The computer-implemented method of claim 44, further comprising processing the chain of replacement messages atomically.

48. A computer-implemented method, comprising:
determining, at a certificate authority, a first private key needs to be revoked;
generating a replacement message that identifies a first root certificate to be revoked and a second root certificate to be activated at a client device, the first root certificate corresponding to the first private key and the second root certificate corresponds to a second private key at the certificate authority, wherein the replacement message is in a chain of replacement messages that each identifies a root certificate to be revoked and another root certificate to be activated, and each replacement message in the chain includes a first field identifying whether a previous message is required and a second field identifying whether a next message is required;
signing the message by at least two private keys corresponding to two root certificates stored at the client device; and
sending the signed message to the client device.

49. The computer-implemented method of claim 48, wherein each replacement message in the chain includes a third field for a hash of the next message.

50. The computer-implemented method of claim 48, wherein each replacement message in the chain includes a third field for a hash of the previous message.

51. The computer-implemented method of claim 48, wherein the replacement message is a dormant certificate revocation message that includes a self revocation note, the self revocation note contains an identifier of the first root certificate to be revoked and a signature signed by the first private key.

* * * * *